US009908206B2

(12) United States Patent
Rigal et al.

(10) Patent No.: US 9,908,206 B2
(45) Date of Patent: Mar. 6, 2018

(54) METHOD FOR PRODUCING A HEAT EXCHANGER MODULE WITH AT LEAST TWO FLUID CIRCULATION CIRCUITS AND HEAT EXCHANGER OBTAINED USING THIS METHOD

(71) Applicant: COMMISSARIAT A L'ENERGIE ATOMIQUE ET AUX ENERGIES ALTERNATIVES, Paris (FR)

(72) Inventors: Emmanuel Rigal, Sassenage (FR); Jean-Marc Leibold, Pont de Claix (FR); Fabien Vidotto, Fontaine (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 572 days.

(21) Appl. No.: 14/390,613

(22) PCT Filed: Apr. 3, 2013

(86) PCT No.: PCT/IB2013/052655
§ 371 (c)(1),
(2) Date: Oct. 3, 2014

(87) PCT Pub. No.: WO2013/150458
PCT Pub. Date: Oct. 10, 2013

(65) Prior Publication Data
US 2015/0298267 A1    Oct. 22, 2015

(30) Foreign Application Priority Data
Apr. 4, 2012  (FR) ..................... 12 53113

(51) Int. Cl.
*B23P 15/26*    (2006.01)
*F28F 3/12*    (2006.01)
(Continued)

(52) U.S. Cl.
CPC ............ *B23P 15/26* (2013.01); *B23K 20/023* (2013.01); *B23K 26/24* (2013.01); *B23K 26/244* (2015.10);
(Continued)

(58) Field of Classification Search
CPC ...... B21D 53/06; B23P 15/26; F28F 2275/06; F28F 2275/061; B23K 1/14;
(Continued)

(56) References Cited

U.S. PATENT DOCUMENTS

| | | | |
|---|---|---|---|
| 3,627,039 A | 12/1971 | Tiefenbacher | ................ 165/158 |
| 3,847,211 A | 11/1974 | Fischel et al. | ................ 165/166 |
| 4,426,762 A | 1/1984 | Schnedecker | ................ 29/527.4 |
| 2008/0116246 A1 | 5/2008 | Rigal et al. | ................... 228/193 |
| 2011/0173813 A1 | 7/2011 | Tochon et al. | ............. 29/890.03 |
| 2012/0168078 A1 | 7/2012 | Couturier et al. | ......... 156/308.2 |

FOREIGN PATENT DOCUMENTS

| | | |
|---|---|---|
| DE | 1551448 | 4/1919 |
| DE | 10 2004 044 861 | 3/2006 |

(Continued)

OTHER PUBLICATIONS

*Fusion reactor first wall fabrication techniques* G. Le Marois, E.Rigal, P.Bucci, (Fusion Engineering and Design pp. 61-62 (2002) 103-110 Elsevier Science B.V).

*Primary Examiner* — Christopher Besler
(74) *Attorney, Agent, or Firm* — Norton Rose Fulbright US LLP

(57) ABSTRACT

The present invention relates to an novel method of producing heat exchangers having at least two fluid circuits each comprising channels, the method employing diffusion bonding achieved using the hot isostatic pressing (HIP) technique, and to a heat exchanger obtained using this method.

20 Claims, 3 Drawing Sheets

(51) Int. Cl.
*F28D 7/00* (2006.01)
*B23K 20/02* (2006.01)
*F28F 9/00* (2006.01)
*F28F 21/08* (2006.01)
*B23K 26/24* (2014.01)
*B23K 26/244* (2014.01)
*B23K 101/06* (2006.01)
*B23K 101/14* (2006.01)

(52) U.S. Cl.
CPC .............. *F28D 7/0025* (2013.01); *F28F 3/12* (2013.01); *F28F 9/001* (2013.01); *F28F 21/082* (2013.01); *B23K 2201/06* (2013.01); *B23K 2201/14* (2013.01); *F28F 2275/061* (2013.01)

(58) Field of Classification Search
CPC .... B23K 1/0012; B23K 20/02; B23K 20/021; B23K 20/001; B23K 20/004; B23K 2201/14; B23K 2201/06
See application file for complete search history.

(56) References Cited

FOREIGN PATENT DOCUMENTS

| | | |
|---|---|---|
| EP | 0025735 | 8/1919 |
| FR | 2 936 179 | 9/2008 |
| WO | WO 2006029720 A1 * | 3/2006 ........... F28D 1/0435 |
| WO | WO 2006/067349 | 6/2006 |
| WO | WO 2011/026925 | 3/2011 |
| WO | WO 2011/036297 | 3/2011 |

* cited by examiner

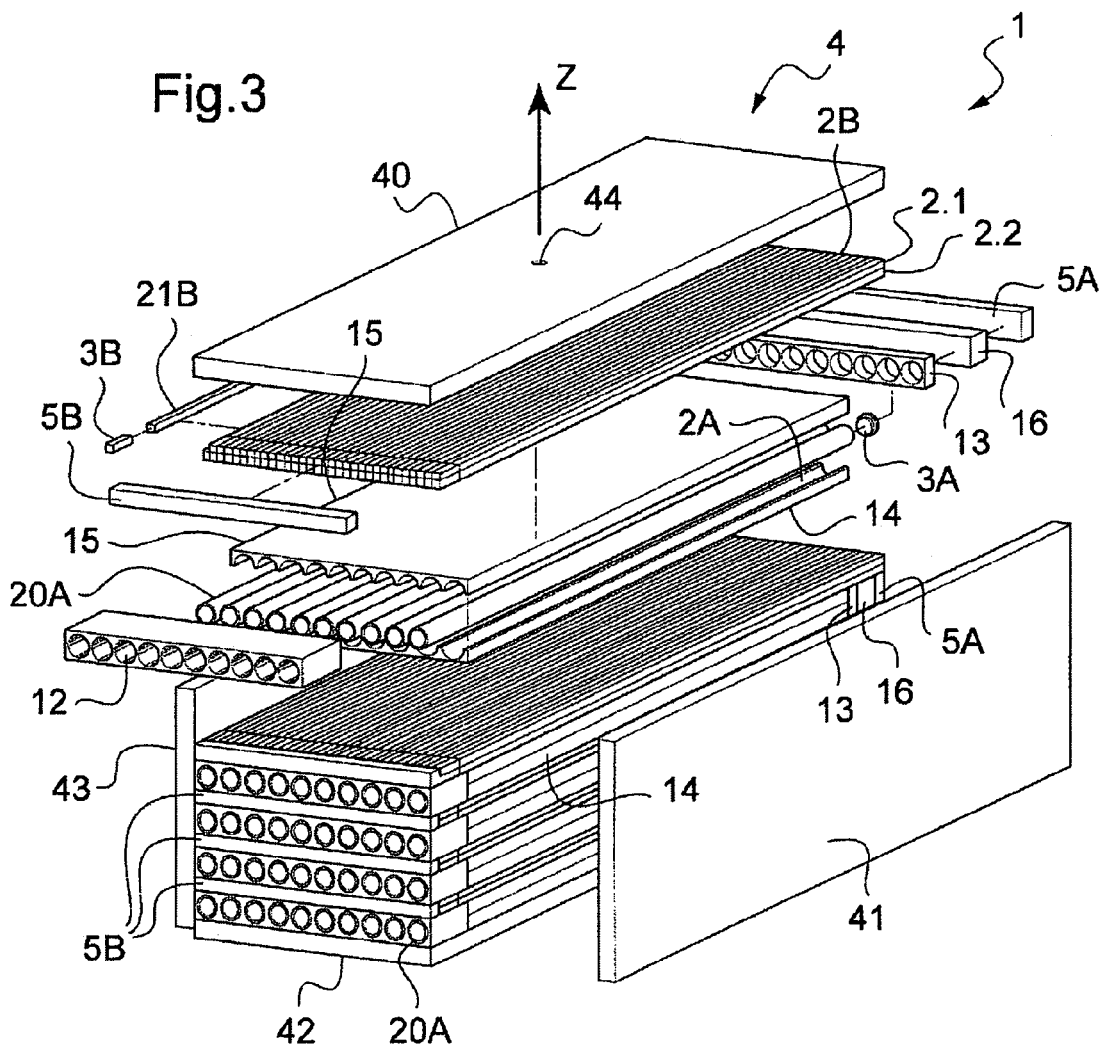

METHOD FOR PRODUCING A HEAT EXCHANGER MODULE WITH AT LEAST TWO FLUID CIRCULATION CIRCUITS AND HEAT EXCHANGER OBTAINED USING THIS METHOD

CROSS-REFERENCE TO RELATED APPLICATIONS

This application is a national phase application under 35 U.S.C. § 371 of International Application No. PCT/IB2013/052655 filed 3 Apr. 2013, which claims priority to French Patent Application No. 1253113 filed 4 Apr. 2012. The entire contents of each of the above-referenced disclosures is specifically incorporated herein by reference without disclaimer.

TECHNICAL FIELD

The present invention relates to heat exchangers with at least two fluid circuits, each comprising channels.

The invention relates more particularly to a new method for manufacturing such exchangers by welding by diffusion, achieved using the hot isostatic pressing (HIP) technique.

Known heat exchangers comprise one or at least two circuits with internal fluid circulation channels. In the exchangers with a single circuit, the heat exchanges take place between the circuit and a surrounding fluid in which it is immersed. In the exchangers with at least two fluid circuits, the heat exchanges take place between the two fluid circuits.

Chemical reactors are known, using a continuous method according to which a small quantity of co-reactants are simultaneously injected, at the inlet of a first fluid circuit, preferably provided with a mixer, and the chemical product obtained is collected at the outlet of said first circuit. Amongst said known chemical reactors, some comprise a second fluid circuit, usually called the utility circuit, the function thereof being to control thermally the chemical reaction, either by providing the heat required for the reaction or conversely by discharging the heat released thereby. Such chemical reactors with two fluid circuits including a utility circuit are usually called exchanger-reactors.

The present invention relates not only to producing heat exchangers having the sole function of heat exchanges but also to the production of exchanger-reactors. Also, "heat exchanger with at least two fluid circuits" has to be understood within the scope of the invention not only as a heat exchanger with the sole function of heat exchanges but also as an exchanger-reactor.

PRIOR ART

The existing heat exchangers, called plate exchangers, have significant advantages relative to the existing heat exchangers, called tube exchangers, in particular the thermal efficiency thereof and the compactness thereof due to an advantageously high surface-to-volume heat exchange ratio.

The known tube exchangers are, for example, tube and calandria exchangers, in which a group of tubes which are straight or bent in a U-shape or a helical shape is fixed to plates which are perforated and arranged inside a casing denoted as a calandria. In said tube and calandria exchangers, one of the fluids circulates inside the tubes whilst the other of the fluids circulates inside the calandria. Said tube and calandria exchangers have a large volume and are thus of reduced compactness.

The known plate exchangers are more compact and are obtained by stacking plates comprising channels and assembled together.

The channels are produced by stamping plates, if required by the addition of folded strips in the form of fins or by machining grooves. The machining is carried out by mechanical means, for example by milling or by chemical means. The chemical machining is usually called chemical or electrochemical engraving.

The assembly of the plates to one another has the purpose of providing the seal and/or the mechanical strength of the exchangers, in particular the resistance to the pressure of the fluids circulating in the interior.

Several assembly techniques are known and implemented according to the type of plate exchanger desired. The assembly may thus be obtained by mechanical means, such as tie rods holding the stack clamped between two thick and rigid plates arranged at the ends of the stack. The channels are thus sealed by the compression of added joints. The assembly may also be obtained by welding, generally limited to the periphery of the plates, which sometimes requires the insertion, subsequent to welding, of the exchanger in a calandria to permit its resistance to the pressure of the fluids. The assembly may also be obtained by brazing, in particular for exchangers to which fins are added. The assembly may finally be obtained by welding by diffusion (diffusion-welding).

The two last techniques cited permit exchangers to be produced which are particularly efficient in terms of mechanical strength. More specifically, due to these two techniques, the assembly is obtained not only on the periphery of the plates but also inside the exchanger.

The plate heat exchangers obtained by welding by diffusion have joints which are even more efficient mechanically than the joints of exchangers obtained by brazing due to the absence of the additional metal required for the brazing.

Diffusion-welding consists in obtaining an assembly in the solid state by applying pressure and heat to the parts to be assembled over a given time. The pressure applied has a dual function: it permits the surfaces to be welded to be brought together, i.e. into contact and it facilitates the elimination by flow-diffusion of the residual porosity in the joints (interfaces).

The pressure may be applied by uniaxial compression, for example using a press provided with a furnace or simply using weights arranged on top of the stack of parts to be assembled. This method is commonly called uniaxial diffusion-welding and has an industrial application for the manufacture of plate heat exchangers.

A significant limitation of the uniaxial diffusion-welding method is that it does not permit the welding of joints in any orientation relative to the direction of the application of the uniaxial compressive pressure.

A further alternative method remedies this drawback. In this other method, the pressure is applied by the pressure of a gas using a sealed casing. This method is commonly called hot isostatic pressing (HIP). A further advantage of the diffusion-welding method by HIP compared to the uniaxial diffusion-welding method is that it is more widespread on an industrial scale. More specifically, HIP is also used for treating batches of cast parts in addition to powder compaction.

The compact plate exchangers obtained by welding by diffusion which are currently known also have major drawbacks which may be listed as follows.

A first major drawback is the cost of manufacturing the plates, in particular in the case of plates with machined channels. Chemical engraving certainly permits some reduction in cost relative to mechanical machining but is entirely relative: more specifically, compared to a given length, the cost of a channel of a plate exchanger produced by chemical engraving is greater than that of a tube exchanger. Moreover, chemical engraving generates additional drawbacks such as insufficient dimensional precision, a rounding of sharp edges which is disadvantageous for welding by diffusion, or residual contamination of the surfaces to be assembled by the residues of the pickling and masking products used.

A second major drawback of compact plate exchangers welded by diffusion is the difficulty of finding a good compromise between the mechanical strength of the interface joints obtained, the acceptable deformation of the channels and the grain enlargement of the structural material.

More specifically, in the uniaxial diffusion-welding method, it is possible to apply a weak, or even very weak, pressure which causes little deformation of the channels provided that the plates are in close mutual contact and that the low value of the pressure is compensated by an increase in the welding temperature to eliminate the porosity at the interfaces. These conditions inevitably imply an enlargement of the grain of the material which rapidly becomes a drawback relative to its resistance to corrosion and its mechanical properties. Moreover, in numerous applications, it is critical that the number of grains of material located between two fluid circuits is minimal to avoid risks of leakage.

In the diffusion-welding method by HIP, the stack of parts is previously encapsulated in a sealed container to prevent gas from penetrating into the interfaces formed by the surfaces to be welded. The gas pressure generally used is high, in the order of 500 to 2000 bar, typically 1000 bar. The minimum operating pressure of industrial casings capable of implementing the HIP is in turn between 40 and 100 bar. Thus, the joints welded at this pressure are weaker than those obtained at high pressure, for example at 1000 bar, all the other conditions being the same (material, temperature, surface condition, etc.) In addition, this pressure between 40 and 100 bar is still too high for plates having a high density of channels, i.e. plates in which their specific contact surface with an adjacent plate is small relative to the visible surface. More specifically, for this type of plate, even a pressure of several tens of bar is sufficient to produce unacceptable deformation of the channels. One possible solution may consist in reducing the assembly temperature so that the material has more resistance to pressure, but this further weakens the strength of the joints. A further possible solution may consist in changing the design of the channels to make the stack more resistant to pressure but this makes the plate exchanger less compact.

Several solutions are already known for producing heat exchangers by HIP diffusion-welding whilst controlling the geometry of the channels and the quality of the interfaces. The common point to these solutions is to produce a stack such that it is possible to leave the channels open during the HIP cycle. Thus, the pressurizing gas occupies all the internal space of the channels and as a result said channels are not deformed or are deformed very little. It thus becomes possible to carry out the HIP at high pressure.

A first known solution consists in using a tube for each channel and to weld at least one end thereof in a sealed manner to the container which in turn is sealed. Each tube is previously inserted into a groove of a plate, then the tubes inserted into the grooves of the same plate are sandwiched with a further plate which is grooved or not and which is adjacent. One of the inventors of the present application has already implemented this solution [1]. The required previous step of sealed welding of at least one end of each tube to the sealed container intrinsically involves a limited number and density of tubes. A major drawback with this solution is that it implies that the channels of the exchanger are able to be produced in the form of tubes, which excludes complex shapes, such as for example shapes with rapid changes of direction which are not able to be produced by bending. Thus, instead of complex shapes, the channels are produced in simpler and less compact shapes. In other words, this first known solution reduces the compactness of a heat exchanger relative to a heat exchanger with grooved plates welded by diffusion according to the prior art, as described in the preamble.

A second known solution is disclosed in the patent application WO 2006/067349. It essentially consists in preventing the interfaces to be welded from opening out into the channels. Thus, the solution according to this patent application consists in producing in the metal plates grooves of open section at their apexes, then sealing said grooves individually by the welding of a thin metal plate, thus leaving one or both ends of the grooves accessible to the pressurizing gas. The problem with welding the ends of the channels is simplified relative to the first known solution but at the cost of having to weld one strip per channel. This may prove laborious, expensive and difficult to implement in the case of a large number of channels per exchanger.

A third known solution is disclosed in the patent application WO 2011/026925. The following steps are carried out:
depositing on a grooved plate a continuous bead of material in relief on the periphery of each groove and a further continuous bead also in relief on the periphery of the plate,
stacking grooved plates with their continuous beads in a container without the grooves having an open end;
sealing the container;
application of an HIP cycle at low pressure during which the seal of each channel delimited individually by at least one groove is obtained using diffusion welding of continuous beads;
boring the channels so as to permit the pressurizing gas to penetrate each channel;
applying an HIP cycle at high pressure to confer to the joints good mechanical properties by diffusion-welding of the surfaces delimited by the continuous beads.

As in the known solution according to the patent application WO 2006/067349, this last known solution may prove laborious, costly and difficult to implement in the case of a large number of channels per exchanger.

There is, therefore, a need to improve further the methods for producing heat exchangers by diffusion-welding, in particular to obtain compact exchangers to improve the mechanical strength of the joints thereof without causing too much deformation of the channels, nor unacceptable enlargement of the grain of the structural material, and to achieve acceptable manufacturing costs and ease of implementation.

SUMMARY OF THE INVENTION

To respond to this need, the subject of the invention is a method for producing a heat exchanger module with at least two fluid circuits, each comprising channels, comprising the following steps:

a/ producing at least two separate groups of metal tubes, each tube being of elongated shape and having at least two straight ends, one thereof being open and the other being blind;

b/ aligning each of the two groups with side-by-side positioning of the tubes in at least one row per group;

c/ alternate stacking with top-to-toe positioning of the row(s) of one group and the row(s) of the other group so as to have the rows on top of one another and the blind ends of the tubes of one group arranged on the same lateral side of the stack as the open ends of the tubes of the other group;

d/ offsetting, in a direction at right angles to the stacking direction, the row(s) of one group relative to the row(s) of the other group, so as to create gaps on each lateral side of the stack, between the blind ends of the tubes of one group and the open ends of the tubes of the other group;

e/ encapsulating the stack by positioning respectively one metal casing on the longitudinal sides of the stack of tubes and metal strips at the end of the offset blind ends of the tubes in each gap created;

f/ welding on the periphery of the casing, each strip and each open tube end so as to seal the inside of the encapsulated stack whilst leaving free the open ends of the tubes;

i/ applying a hot isostatic pressing (HIP) cycle at high pressure to the degassed stack, allowing the pressurizing gas to penetrate into all of the tubes via their open ends so as to obtain welding by diffusion between the constituent parts of the encapsulated stack, the tubes of each group welded by diffusion forming the channels of a fluid circuit of the module.

According to an advantageous embodiment of the invention, the casing comprises a through-opening and the following steps are carried out between steps f/ and i/:

g/ degassing the interior of the sealed stack via the through-opening;

h/ closing the through-opening.

These steps g/ and h/ are advantageously carried out as a function of the materials of the constituent parts of the stack and the desired performance in terms of mechanical strength of the zones for welding by diffusion.

Thus, the invention is essentially a method for producing a heat exchanger with at least two fluids, from tubes assembled by diffusion welding using HIP at high pressure. The tubes which ultimately constitute the fluid circulation channels have a lower manufacturing cost than the grooves machined into the plates according to the prior art. Since, according to the method of the invention, no surface to be welded opens into the tubes, it is possible to apply a higher assembly pressure which ensures good mechanical properties and low deformation of the channels: as the pressurizing gas penetrates into the tubes, there is no risk of compression of said tubes. The use of HIP diffusion-welding at high pressure thus makes it possible to avoid having recourse to very high welding temperatures and thus facilitates the retention of an acceptable grain size of the structural material.

The sealed welding according to step f/ of the method according to the invention may be implemented by any appropriate means such as laser welding, TIG (English acronym used for "Tungsten Inert Gas" welding) or the like.

The through-opening in the metal casing makes it possible to weld a seal weld hole designed to degas the stack according to step g/ and to test the seal thereof. All the component parts of the stack have preferably been previously cleaned to guarantee efficient diffusion-welding. After having degassed the stack via the seal weld hole, said stack is closed in a sealed manner preferably by compression and welding.

The assembly step i/, in other words by HIP diffusion-welding, thus consists in applying to the stack an HIP cycle at high pressure. Said cycle is selected, in particular, as a function of the material(s) of the constituent parts of the stack. In particular, it is possible to select the temperature level and the heating and pressurizing speeds (respectively of cooling and depressurizing) in particular taking into account the capacities of the HIP casing used. Advantageously an HIP cycle according to step if comprises heating for a duration of between 1 and 4 hrs, with simultaneous pressurizing at a pressure ranging between 500 and 2000 bar, then maintaining the level of temperature and pressure for a duration of between 1 and 4 hrs and finally cooling with simultaneous depressurizing for a duration of between 1 and 10 hrs. During this HIP step i/, each part of the stack is welded by diffusion with the parts in contact therewith.

The method according to the invention may comprise a step j/ subsequent to step if consisting of a thermal treatment designed to restore the properties of the metal materials of the parts constituting said module. It may consist of a rapid quenching treatment.

The method according to the invention makes it possible to obtain heat exchangers with at least two fluid circuits, which are compact and of which the assembly by HIP diffusion-welding at high pressure does not permit the channels to be compressed or excessive alteration to the structural material by unacceptable grain enlargement.

Moreover, the cost and the ease of implementing the method according to the invention are acceptable.

According to an advantageous embodiment, the tubes produced according to step a/ are straight tubes.

The tubes may all be identical to one another.

Thus, according to an advantageous variant, the tubes of at least one group are straight and of square section over their length.

The tubes of at least one group may be straight and of circular section over the major part of their length, their open and blind ends being of square section.

At least one of the ends of square section may be formed by drawing the circular section of the tubes.

Alternatively, at least one of the ends of square section may be produced by welding a solid stopper having an end of square section.

The stopper may preferably be a solid stopper, thus forming a blind end of a tube. The solid stopper may be advantageously made of material capable of being dissolved by chemical means.

According to a variant, at least one of the ends of square section may be formed by an end piece of square section in which the circular section of a tube is press-fitted. Preferably, a single end piece is provided for a row of tubes all press-fitted inside said end piece.

According to an advantageous embodiment, the step e/ is carried out with a casing comprising four metal plates, each being pressed against one of the four longitudinal edges of the stack and the step f/ being carried out by welding the four metal plates in pairs. At least one of the plates may comprise the through-opening via which the step g/ for degassing is implemented.

Preferably, the HIP cycle according to step i/ is carried out at a pressure of between 500 and 2000 bar, advantageously 1000 bar.

According to an advantageous embodiment, the method according to the invention comprises a step j/, subsequent to step i/, consisting of a heat treatment designed to restore the properties of the metal materials of the parts which constitute said module.

According to an advantageous embodiment, the method according to the invention comprises a step l/ of transverse boring of the tubes, in the plane of each row and in the vicinity of the lateral sides of the stack, the orifices of each group of tubes, produced by boring, opening out onto one longitudinal side of the stack through the casing, forming a column, the two columns of orifices each being arranged in the vicinity of one lateral side of the stack and opposing one another.

According to an advantageous embodiment, the method according to the invention comprises a step m/ of welding a fluid collector to the casing, opposite and around each column of orifices.

According to an advantageous embodiment, the method according to the invention comprises a step of cleaning the constituent parts of the encapsulated stack before the degassing step g/.

The subject of the invention is also a heat exchanger module having at least two fluid circuits obtained according to the method as disclosed above.

Advantageously, at least the tubes, the strips and the casing are made of austenitic steel, such as 316L steel.

Finally, the subject of the invention is a heat exchanger system comprising a plurality of modules as above, connected together.

DETAILED DESCRIPTION

Further advantages and features of the invention will be revealed more clearly from reading the detailed description of exemplary embodiments of the invention made by way of illustrative and non-limiting example, with reference to the following figures, in which:

FIG. 1A is a perspective exploded view of a metal tube with one of its ends used in the assembly of FIG. 1;

FIG. 1B is a perspective view of a heat exchanger module obtained from the assembly of components of FIG. 1 partially broken away and integrating an inlet collector and an outlet collector for one of the two fluids;

FIG. 3 is a perspective and partially exploded view of an assembly of components from which a third example of the method for producing an exchanger-reactor module according to the invention is implemented.

Figure 1:
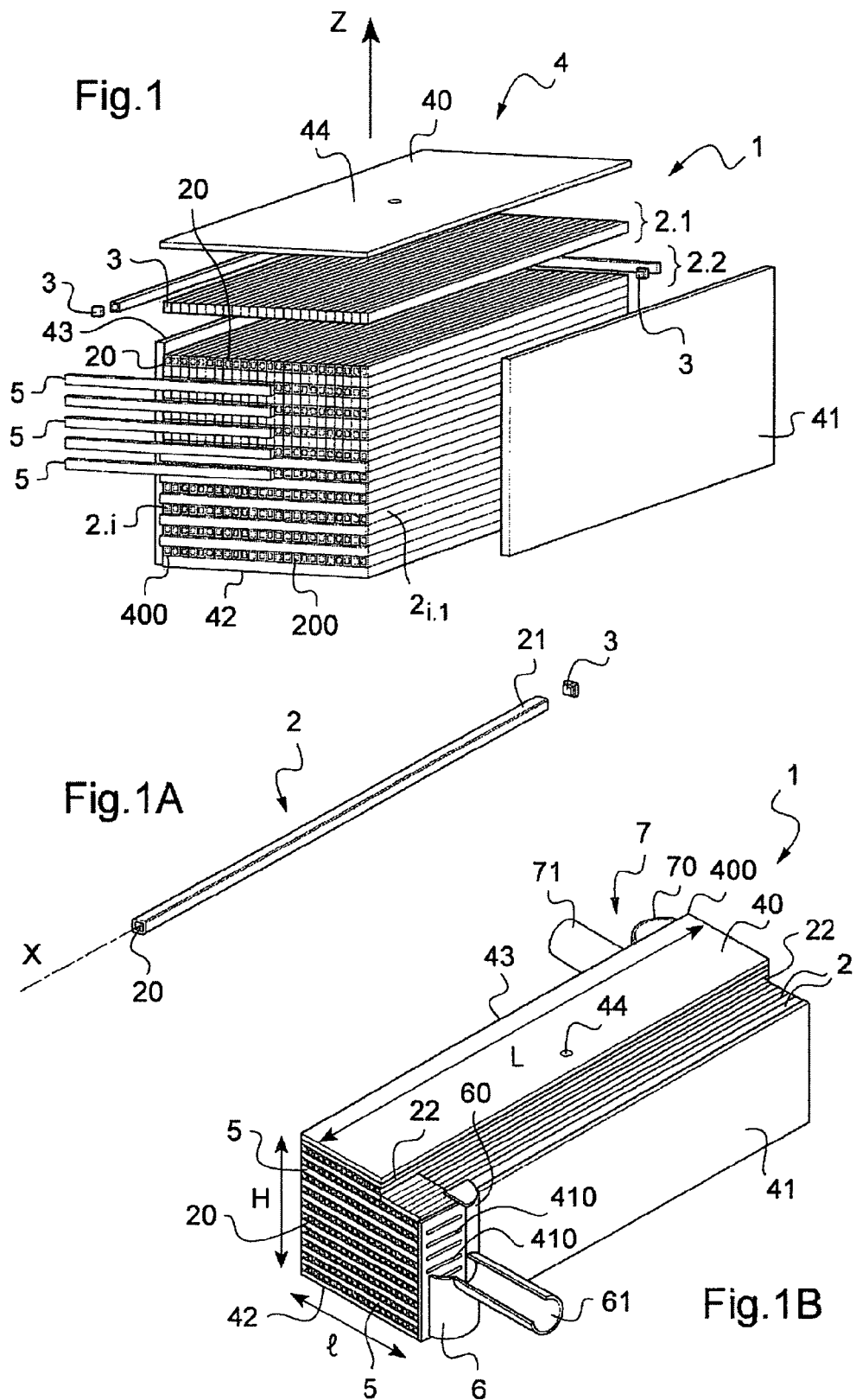
FIG. 1 is a perspective and partially exploded view of an assembly of components from which a first example of the method for producing a heat exchanger module with two fluid circuits according to the invention is implemented.

In the following description the terms "upper" and "lower" are to be considered with reference to the direction Z of stacking the tubes according to the invention.

Similarly, the terms "longitudinal" and "lateral" are to be considered in relation to the geometric shape of the stack, itself determined by the elongated shape of the tubes which constitute said stack. Thus, the four longitudinal sides of the stack are those which extend parallel to the longitudinal axis X of the tubes. The two lateral sides of the stack are those at the end of the tubes and which extend at right angles to the longitudinal axis X of the tubes.

Example 1

Step a/: a heat exchanger module 1 with two fluid circuits is produced from a plurality of metal tubes 2 all identical with one another.

As illustrated most clearly in FIG. 1A, each metal tube 2 is straight with a longitudinal axis X, of square section over its entire length with an open end 20 left as after manufacture and with the other of its ends 21 closed in a sealed manner by a solid stopper 3 also of square section. In other words, once finished, each straight tube 2 is open at one of its ends 20 and blind at the opposing end 21, 3.

By way of example, a manufactured tube 2 is made of 316L stainless steel and has an external square section of 6×6 mm over a length of 400 mm and a wall thickness of 1.5 mm. By way of example also, a solid stopper 3 is also made of 316L stainless steel and is welded by TIG welding at the end 21 of the tube 2.

Each metal tube 2 of square section thus defines a fluid circulation channel of the exchanger as explained below.

Steps b/ to d/: the tubes 2 obtained are aligned forming adjacent rows 2.1, 2.2 . . . 2.i−1, 2.i . . . , i.e. each row is formed by a plurality of tubes 2 joined to one another by one of their longitudinal sides in the same plane. All the adjacent rows 2.1, 2.2 . . . 2.i−1, 2.i . . . , have the same number of straight tubes 2.

The adjacent rows 2.1, 2.2 . . . 2.i−1, 2.i . . . are stacked alternately with top-to-toe positioning in a stacking direction Z, so as to have all the rows on top of one another and the blind ends of the tubes 21, 3 of one row 2.1, 2.3, . . . 2.i−1 . . . arranged on the same lateral side of the stack as the open ends 20 of the tubes 2 of an adjacent row 2.2, 2.4, . . . 2.i.

In the example illustrated in FIG. 1, it is possible to see that each adjacent row having the index i with an even number 2.2, 2.4, . . . 2.i . . . has its open end 20 visible, whilst each adjacent row having the index i−1 with an odd number 2.1, 2.3, . . . 2.i−1 . . . has its blind end 21, 3 visible. Also as illustrated in FIG. 1, each adjacent row consists of a number equal to twenty straight tubes 2 and the stack consists of a number equal to twenty rows 2.2, 2.2, 2.3 . . . 2.20 of straight tubes.

In the example illustrated in FIG. 1, two adjacent rows 2.1, 2.2, . . . 2.i−1, 2.i, i.e. in contact with one another in the stack are positioned top-to-toe as above. A top-to-toe positioning of a group of rows may also be provided, each group being formed from a plurality of adjacent rows superposed in the same orientation. Thus, for example, it is possible to provide a group of two rows 2.1, 2.3 stacked on top of one another and alternating and positioned top-to-toe with a group of two rows 2.2, 2.4 in turn stacked on top of one another.

In the longitudinal direction of the stack, i.e. at right angles to the stacking direction Z, an offsetting of the rows 2.1, 2.3, . . . 2.i−1 is also carried out relative to the other rows 2.2, 2.4, . . . 2.i so as to create on each lateral side of the stack gaps between the blind ends 21, 3 of the tubes and the open ends 20 of the tubes.

In the example illustrated in FIG. 1, the gaps created are all of equal value. For example, the value of said gaps obtained by the offset is equal to 3 mm.

Step e/: thus an encapsulation of the stack is produced by respectively positioning a metal casing 4 on the longitudinal sides of the stack of tubes 2 and metal strips 5 at the end of the offset blind ends 3 of the tubes, in each gap formed.

In the example illustrated in FIG. 1, the metal casing 4 consists of four metal plates 40, 41, 42, 43, including two 40, 42 respectively forming upper and lower terminal plates of the stack and the two others 41, 43 constitute closing plates of the stack. A through-opening 44 is bored into one of the plates of the casing 4.

By way of example, said four plates 40, 41, 42, 43 are made of 316L stainless steel and each with a thickness of 4 mm.

Also by way of example, all the metal strips 5 are identical and of equal thickness to the offset gap produced. They may be produced from 316L stainless steel.

As illustrated in FIG. 1, the through-opening 44 is produced in the upper terminal plate 40.

Step f/: after having cleaned all of the parts, the welding is carried out on the periphery of the casing 4, each strip 5 and each open end 20 of the tube 2 so as to seal the interior of the encapsulated stack whilst leaving free the open ends 20 of the tubes. Weld seams, typically by TIG welding, may be produced to make the stack completely sealed. Thus, weld seams are advantageously produced along overlapping seams 400, in pairs, of the four metal plates 40, 41, 42, 43, further weld seams are produced along the strips 5 and finally further weld seams are produced on the interface lines 200, in pairs, of the open ends 20 of the tubes 2.

Steps g and h/: a seal weld hole, not shown, is fixed in the through-opening 44. The fixing may be carried out by TIG welding. By way of example, the seal weld hole may have an internal diameter of 6 mm.

The degassing of the interior of the stack is carried out via the seal weld hole, and then the actual seal welding of the seal weld hole, i.e. the pinching thereof to make the interior of the degassed stack sealed relative to the outside.

Step i/: after degassing and seal welding according to steps g/ and h/, an HIP cycle at high pressure is applied to the stack, comprising heating to 1080° C., pressurizing to 1000 bar in 2 hrs, maintaining the level of temperature and pressure for 2 hrs, then concomittant cooling and depressurizing in 5 hrs. During this HIP cycle, the gas penetrates into all of the tubes 2 via the open end 20 thereof but does not infiltrate the interfaces between the parts of the stack due to the welded stopper 3 and to the sealing welds produced on the periphery of the casing 4, of each strip 5 and of each open end 20 of the tube 2.

Step j/: this optional step subsequent to step i/ consists in applying to the module a heat treatment designed to restore the properties of the metal materials of the components forming the module. It may advantageously be a heat treatment of rapid quenching designed to restore the properties of the 316L steel.

Step k/: then the seal weld hole is removed, for example by mechanical means.

At this stage of the method, an intermediate block is obtained of generally parallelepiped shape. By way of example, such a block may be a rectangular parallelepiped with two square faces. The dimensions L*W*H of such a block may be 405*128*128 mm.

Step l/: transverse boring is carried out in the plane of each row and in the vicinity of the lateral sides of the stack, through at least one closing plate 41 and through the walls of the tubes 2 of each row 2.1, 2.2, ... 2.*i* with the exception of the walls of the tubes 2 which bear against the opposing closing plate 43.

The boring operations carried out leave whole the metal strips 5 welded at the end of the stack. The boring operations carried out may partially or completely eliminate the solid stoppers 3. As a result, the thickness of the metal strips 5 is selected ultimately to confer to the exchanger obtained sufficient mechanical resistance, in particular to pressure, without having the need for an excessive thickness provided by all or some of the stoppers 3. By way of example, the boring may be carried out by mechanical machining.

As illustrated in FIG. 1B, once the boring operations have been carried out, all of the tubes 2 of the same row 2.1, 2.2, ... 2.*i* communicate with one another via the orifices 22 which extend transversely to the axis X of the tubes 2 and open out onto the same orifice 410 bored in the closing plate 41 in the vicinity of the metal strip 5 of the relevant row.

As illustrated in FIG. 1B, the orifices 22 and 410 may be elongated slots of rectangular section.

Thus, once the boring has been carried out, all of the orifices 410 bored in the closing plate 41, and onto which the orifices 22 of a group of rows 2.1, 2.3, ... 2.*i*–1 or 2.2, 2.4, ... 2*i* positioned in the same orientation during the steps b/ to d/ open, are aligned forming a column.

In other words, in one column, two adjacent orifices 410 are separated from one another by a height equal to the thickness of a row of tubes 2 positioned top-to-toe during steps b/ to d/ and not bored at this point.

Thus, once the boring has been carried out two columns of orifices 22, 410 are obtained, opening out into a longitudinal side of the stack and each arranged in the vicinity of one of its two lateral sides.

In the example illustrated in FIG. 1B, a column of orifices 22, 410 opens through the closing plate 41 in the vicinity of one lateral side of the stack and the other column opens out onto the closing plate 43 opposing the closing plate 41 in the vicinity of the other lateral side of the stack.

Alternatively, it is naturally possible to produce bored areas 22, 410 which open out solely through a single closing plate 41. According to this variant, therefore, the two columns of orifices open out through the same closing plate, one of the columns being arranged in the vicinity of one lateral side of the stack and opposing the other column arranged in the vicinity of the other lateral side of the stack.

Thus, once the boring step l/ is carried out, a fluid circulation channel of the exchanger module is delimited longitudinally by a tube 2 of one row, at the end by a strip 5 and/or by the solid stopper 3 of the row concerned, and finally transversely via the orifices 22 and 410 of the row concerned.

Step m/: a fluid collector 6, 7 is welded to the metal casing opposite and around each column of orifices 22, 410.

As illustrated in FIG. 1B, each collector 6, 7 respectively consists of a semi-cylindrical closed portion 60, 70 and a tubular portion 61, 71 opening out into the semi-cylindrical portion.

As illustrated in FIG. 1B, the semi-cylindrical closed portion 60, 70 is welded solely onto one of the closing plates 41, 43.

Although not shown, a fluid collector is also welded at the end on both sides of the exchanger module so as to supply a fluid in the region of the open ends 20 of the tubes 2.

Due to the method according to steps a/ to m/ a heat exchanger module is obtained which is compact and assembled by HIP diffusion-welding at high pressure.

Such a heat exchanger module according to the example l/ may be considered as having fluid circulation channels of small dimensions.

In such a heat exchanger module, each fluid follows an L-shaped path and the heat transfer from one of the two fluids to the other is carried out between two adjacent rows in the stack since a fluid circulates in the rows of the uneven line of tubes 2.1, 2.3, . . . 2.*i* whilst the other circulates in the rows of the even line of tubes 2.2, 2.4, . . . 2.*i*.

Such an exchanger module may function according to a concurrent or counter-current transfer mode. In the concurrent transfer mode, one of the fluids penetrates the module via the open ends 20 of the tubes 2 from one lateral side of the stack and the other fluid penetrates via the fluid collector 6 or 7 in the vicinity of the same lateral side. In the counter-current transfer mode, one of the fluids penetrates into the module via the open ends 20 of the tubes 2 from one lateral side of the stack and the other fluid penetrates via the fluid collector 7 or 6 in the vicinity of the opposing lateral side.

Thus, the collector 6 or 7 welded to one of the closing plates may be an inlet collector or outlet collector for one of the fluids.

Example 2

Step a/: a heat exchanger is produced with two circuits of a plurality of metal tubes 2 which are all identical to one another.

Figure 2:
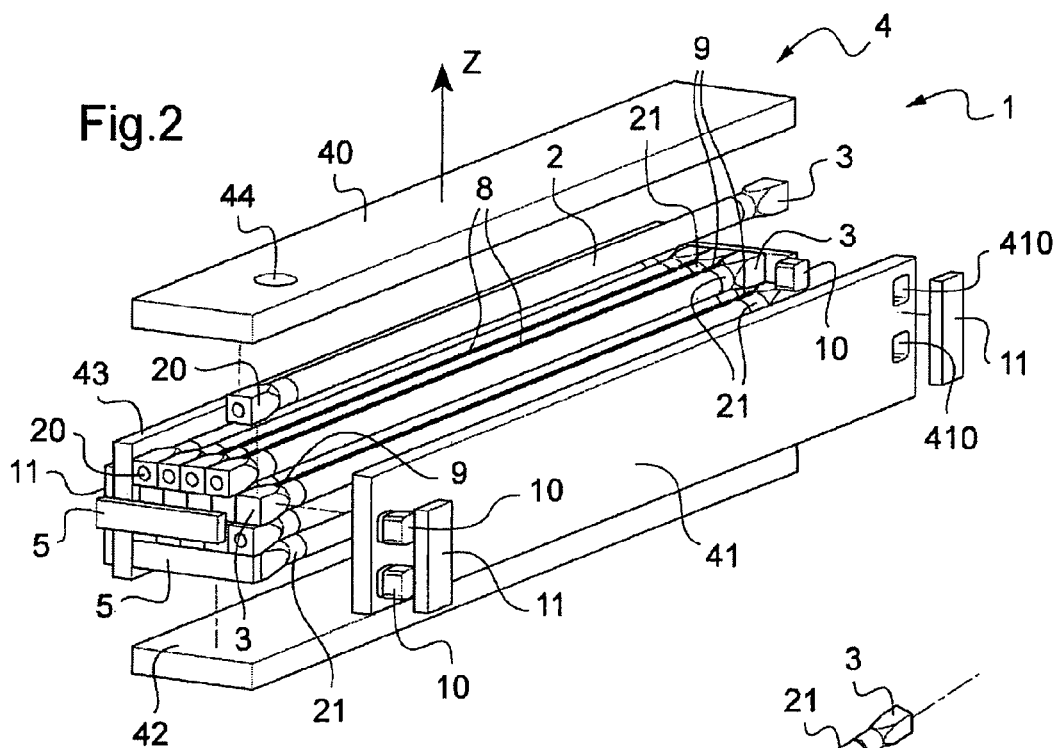
FIG. 2 is a perspective and partially exploded view of an assembly of components from which a second example of the method for producing a heat exchanger module with two fluid circuits according to the invention is implemented.
Figure 2A:
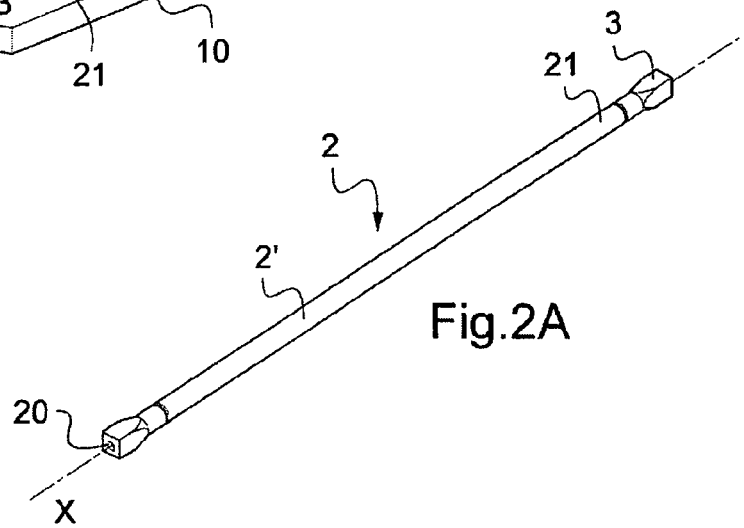
FIGS. 2A to 2C are perspective views respectively of a metal tube and its ends used in the assembly of FIG. 2.
Figure 2B:
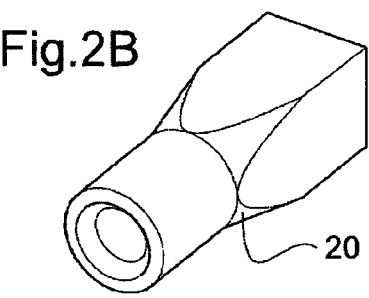
Figure 2C:
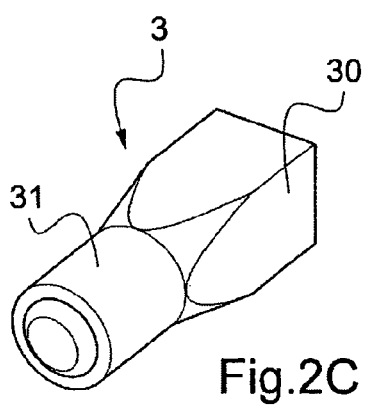

As best illustrated in FIG. 2A, each metal tube 2 is straight having the longitudinal axis X and of circular section over the major part 2' of its length, its open 20 and blind 3 ends being of square section.

In the illustrated example, the open end 20 is formed by drawing the circular section of the tubes. The blind end is produced by TIG welding of a solid stopper 3. Said solid stopper 3 comprises a square section 30 extended by a circular tubular section 31 positioned at the end 21 of the circular straight part 2' before the welding thereof to produce the blind end 3.

By way of example, a manufactured tube 2 is made of 316L stainless steel and has a wall thickness of 1 mm and a circular section 2' of external diameter 4 mm over a length of 127.5 mm to which is added an open end 20 formed by drawing with a square geometry 4×4 mm over a length of 4 mm, the transition zone between the square section and the circular section being 4 mm. Also, by way of example, a solid stopper 3 made of nickel has a square section 30 4×4 mm over a length of 4 mm, a transition zone between the square section 30 and the circular section 31 of 4 mm and a circular section of diameter 4 mm over a length of 5 mm. The total length is 135.5 mm.

Thus each metal tube 2 of circular section over the major part of its length defines a fluid circulation channel of the exchanger as explained below.

Steps b/ to d/ are also carried out as in the example 1/ with a single row per group of stacked tubes alternating with a single row of the other group.

In contrast, in this example 2, the metal tubes 2 of one row are joined together by their square sections and with those of the adjacent row also by their square sections.

In the example illustrated in FIG. 2, each row consists of a number equal to five straight tubes 2 and the stack consists of a number equal to four rows of straight tubes.

In the example illustrated in FIG. 2, the gaps created are all of equal value. For example, the value of these gaps obtained by offsetting is 2 mm.

As illustrated in FIG. 2, the example 2/ is also distinguished from the example 1/ by the presence of wires 8, 9 inserted individually in the space left free between two tubes 2 side-by-side.

The wires 8 are made of a material which is a very good thermal conductor. They may be advantageously made of copper. By way of example, the wires 8 have a diameter of 1 mm over a length of 122 mm.

A wire 9 is inserted in the extension of each of these wires 8 and on the side of the solid stoppers 3, the function thereof being to protect the wire 8 in case of a subsequent step of dissolving the solid stopper 3 by chemical means. These wires 9 may be made, for example, of 316L stainless steel. By way of example, each wire 9 has a diameter of 1 mm over a length of 10 mm.

Step e/ is carried out as in the example 1/ with encapsulation of the stack by respectively positioning a metal casing 4 on the longitudinal sides of the stack of tubes 2 and metal strips 5 at the end of the offset blind ends 3 of the tubes, in each gap formed.

By way of example, the four plates 40, 41, 42, 43 of the example 2/ of FIG. 2/ are made of 316L stainless steel and each having a thickness of 4 mm. As in the example 1/a through-opening to accommodate a seal weld hole is bored into the upper plate 40. By way of example, the seal weld hole has an internal diameter of 6 mm.

Also by way of example, all of the metal strips 5 are identical and of a thickness equal to the offset gap produced. They may be produced from 316L stainless steel.

As illustrated in FIG. 2, the example 2/ is also distinguished from the example 1/ by the presence of orifices 410 bored in the two closing plates 41, 43 prior to the HIP step i/. Said orifices 410 are thus bored on both opposing sides of each row of tubes 2 but solely opposite the solid stoppers 3. Inside each of said orifices 410 produced by boring is inserted a stud 10 advantageously of complementary shape.

The function of said studs 10 is to fill the internal space of the orifices 410 during the HIP step i/ and to be able to be eliminated by dissolving by chemical means.

Said studs 10 are preferably made of the same material as the solid stoppers 3. They are advantageously made of nickel.

In this example 2/, the encapsulation casing comprises metal strips 11 which bear against the closing plates 41, 43 covering the studs 10 housed in the orifices 410. By way of example, the strips 11 are made of 316L stainless steel.

The welding step f/ is implemented as in the example 1/ after having cleaned each of the components of the stack, and also by means of weld seams, preferably by TIG welding, produced around each of the metal strips 11 on the closing plates 41, 43 and also to make the stack completely sealed.

Step h/ is carried out as in the example 1/.

Step i/ is carried out by applying to the stack an HIP cycle comprising heating to 1040° C., simultaneous pressurizing to 1000 bar for 2 hrs, maintaining the level of temperature and pressure for 2 hrs, then cooling and depressurizing for 5 hrs. During this operation, the gas penetrates into the channels via their open end 20 which has the result of slightly modifying the geometry of their circular section by the elimination of the gaps located between the tubes 2 and the wires 8.

Step j/ of a heat treatment of rapid quenching designed to restore the properties of the 316L steel is carried out, if required, as in the example 1/.

Step k/ is carried out as in the example 1/ but without the metal strips 11, preferably by machining, which has the effect of making accessible the solid stoppers 3 and studs 10 made of material capable of being dissolved via chemical means, such as nickel.

Step l/: now the stack is immersed in a bath of nitric acid which has the effect of dissolving all the solid stoppers 3 and the studs 10 and thus makes it possible for the ends of the tubes to be opened transversely in the plane of each row, whilst leaving the metal strips 5 in place. Thus, the seal at the end of each row is ensured by a welded metal strip 5. During this step of immersion of the stack, the wires 9, for example made of 316L steel, prevent the nitric acid from reaching the thermal conductor wires 8, for example made of copper, also welded by diffusion to the tubes 2.

The step m/ of welding is carried out as in the example 1/ but here two fluid collectors are attached per circuit, each opposite and around the orifices 410 of a column. Thus, for one fluid circuit, in this case two collectors are welded opposite one another and on both sides of the stack.

Due to the method according to steps a/ to m/, a heat exchanger module is obtained which is compact and assembled by HIP diffusion-welding at high pressure.

Such a heat exchanger module according to the example 2/ may be considered as having fluid circulation channels of small dimensions and improved thermal performance by the presence of the thermal conductor wires 9 inside the stack and welded by diffusion to the channels.

Example 3

Step a/: a heat reactor-exchanger with two circuits of a plurality of metal tubes 2A, 2B of two different types.

As illustrated in FIG. 3, the tubes 2A of greater section constitute the reaction part of the reactor whilst the tubes 2B of smaller section constitute the part usually called the utility part.

As best illustrated in FIG. 3, each metal tube 2A is straight, of circular section over its entire length with an open end 20 left as after manufacture and with the other of its ends 21 closed in a sealed manner by a solid stopper 3A also of circular section. In other words, once finished, each straight tube 2A is open at one of its ends 20A and blind at the opposing end 21A, 3A.

By way of example, a manufactured tube 2A is made of 316L stainless steel and has an external diameter of 12 mm over a length of 450 mm and a wall thickness of 1 mm. Also by way of example, the solid stopper 3A is also a nickel pellet and welded by TIG welding at the end 21A of the tube 2A. By way of example, a pellet 3A is of 4 mm thickness, reducing to 2 mm.

Each tube 2B is straight, of square section over its entire length, with an open end 20B left as after manufacture and with the other of its ends 21B closed in a sealed manner by a solid stopper 3B, also of square section.

By way of example, a manufactured tube 2B is made of 316L stainless steel and has a square section of 4×4 mm, over a length of 450 mm, and wall thickness of 1 mm. By way of example also, a solid stopper 3B is made of nickel and welded by TIG welding to the end 21B of the tube 2B. By way of example, a solid stopper 3B has dimensions of 4*4*22 mm, reducing to 2 mm.

Steps b/ to d/: they are different from those of the examples 1/ and 2/ as here a single row 2.3 of the group of tubes 2A of circular section is stacked alternately with two rows 2.1, 2.2 of the group of tubes 2B of square section.

In other words, as illustrated in FIG. 3, two rows 2.1, 2.2 of tubes 2B of square section are stacked on top of one another and both stacked alternately with top-to-toe positioning, with a single row 2.3 of tubes 2A of circular section.

As illustrated in FIG. 3, the ends 20A and 21A of the tubes 2A of circular section of the same row 2.3 are formed in a square and each are press-fitted inside an end piece 12, 13 of square section. Preferably, the end pieces 12, 13 are made of the same material as the tubes 2A of circular section, for example 316L stainless steel.

Thus, in this example 3, the tubes 2A of one row are not completely joined together due to the wall thicknesses of the end pieces 12, 13.

Also as illustrated in FIG. 3, each row of the group of straight tubes 2A of circular section consists of a number equal to ten tubes and each row of the group of straight tubes of square section 2B consists of a number equal to thirty two tubes.

Each row of the group of straight tubes 2A of circular section is inserted between two advantageously identical grooved plates 14, 15. Said two grooved plates 14, 15 act as half shells about the tubes 2A of one row. In other words, positioned about the straight tubes 2A of the same row, the grooves of the plates 14, 15 individually espouse the shape of each straight tube of circular section 2A.

Thus, as illustrated in FIG. 3, in the stack, two grooved plates 14, 15 encapsulate by contact one row 2.3 of tubes of circular section 2A and are each in surface contact with an adjacent row 2.2 of the group of tubes 2B of square section.

The grooved plates 14, 15 are made of a material which is a very good thermal conductor. They may be advantageously made of copper alloy CuCrZr.

The plates 14, 15 are preferably all identical to one another in the stack.

By way of example, a grooved plate 14 or 15 has a thickness of 7 mm and has grooves having a diameter of 12.2 mm produced with a pitch of 12.7 mm.

Thus, by way of example, the dimensions of a row of tubes of circular section 2A are 452×128×14 mm.

In comparison, by way of example and with the numbered data indicated above, the dimensions of the two rows 2.1, 2.2 stacked on top of one another of the group of tubes of square section 2B are 470×128×8 mm.

The rows 2.1, 2.2 of the group of tubes of square section 2B are thus longer by 18 mm than a row 2.3 of the group of tubes of circular section 2A.

Thus, in the example illustrated in FIG. 3, the gaps created at the blind ends 21A, 3A of the tubes 2A of circular section have a value greater than those of the blind ends 21B, 3B of the tubes 2B of square section.

Here, to fill up the gaps of different value at the blind ends 21A, 3A of the tubes 2A of circular section and at the blind ends 21B, 3B of the tubes 2B of square section, a bar 16 is added at the end of each blind end 21A, 3A of the tubes 2A of circular section. The bar 16 is made of a material capable of being dissolved by chemical means. By way of example, it is made of nickel. Its dimensions may be 18×128×14 mm.

Step e/: this is carried out as in the example 1/ with encapsulation of the stack by respectively positioning a metal casing 4 on the longitudinal sides of the stack of tubes 2A, 2B but with metal strips 5A and 5B of different heights at the end of the offset blind ends 3 of the tubes, respectively 2A and 2B.

By way of example, the four plates 40, 41, 42, 43 of the example 3/ of FIG. 3/ are made of 316L stainless steel, each having a thickness of 4 mm. All as in the example 1/, the upper plate 40 is bored by a through-opening to accommodate a seal weld hole. By way of example, the seal weld hole has an internal diameter of 6 mm.

By way of example, the metal strip 5A has dimensions of 10*128*14 mm and a metal strip 5B has dimensions of 10*128*8 mm.

The welding step f/ is carried out as in the examples 1/ and 2/ after having cleaned each of the components of the stack, and also with weld seams, preferably by TIG welding, produced around each end 12, each strip 5A and 5B and each of the open ends 20A of the tubes of circular section to make the stack completely sealed.

Step i/ is carried out by applying an HIP cycle to the stack comprising heating to 1040° C. simultaneous pressurizing to 1000 bar for 2 hrs, maintaining a level of temperature and pressure for 3 hrs, then concomittantly cooling and depressurizing for 5 hrs. During this operation, the gas penetrates the tubes 2A, 2B via their open end 20A, 20B but does not infiltrate the interfaces between the components of the stack due to the solid stoppers welded 3A, 3B to the strips 5A, 5B and to the peripheral sealing welds.

The heat treatment step j/ consists in a rapid quenching treatment, simultaneously permitting the dissolution of the copper alloy CuCrZr and 316L steel followed by an ageing treatment of CuCrZr.

Step k/ is carried out as in the example 1/.

Step l/: as in the example 1/ at least one closing plate 41 is bored by machining, on the one hand, opposite the bars 16 and solid stoppers 3A and, on the other hand, opposite the solid stoppers 3B.

Thus the stack is immersed in a bath of nitric acid as in the example 2, which has the result of dissolving all the solid stoppers 3A and 3B and the bars 16 and thus permits the ends of the tubes 2A, 2B to be opened transversely in the plane of each row whilst leaving the metal strips 5A, 5B in place. Thus the seal at the end of each row is ensured by a welded metal strip 5A or 5B. During this step of immersion of the stack, the end pieces 12, 13, for example made of 316L steel, prevent the nitric acid from reaching the grooved plates 14, 15 which are very good thermal conductors, for example made of CuCrZr, and also welded by diffusion to the tubes 2A and 2B. Static mixers may be inserted into the reaction tubes 2A.

The welding step m/ is carried out as in the example 1/.

Due to the method according to steps a/ to m/, a heat exchanger-reactor module is obtained which is compact and assembled by HIP diffusion-welding at high pressure.

Such a heat exchanger module according to the example 3/ may be considered as having fluid circulation channels of small dimensions and improved thermal performance and continuous reaction by the presence of plates 14, 15 which are very good thermal conductors and welded by diffusion to the channels and which surround the tubes of circular section 2A which preferably constitute the reaction channels.

Naturally, the present invention is not limited to the described variants and embodiments provided by way of illustrative and non-limiting examples.

Thus, for example, tubes of circular, square, rectangular, hexagonal section or any other cross-sectional geometry suitable for the application of the desired exchanger may also be used to produce the fluid circulation channels. The tubes may also have a geometry in a zigzag shape or the like, all having an elongated shape and with ends of straight section and, in this case, additional metal strips may be added on both sides of the rows of tubes so as to fill the space therebetween and the metal plates constituting the metal encapsulation casing.

The open end of the tubes may be shaped by any means adapted to a cross-sectional geometry which is different from that of the current length, or welded to a bored stopper, the solution retained depending on the presence or not of the plates clamping the tubes as in the example 3/ and on the facility of shaping the tubes (nature of the material, wall thickness, etc.).

The blind end of the tubes may be obtained by pinching, by the welding of a stopper, a pellet or by any other suitable means.

As indicated in the example 3/, the size of the channels for each of the fluid circuits may be different according to the nature and the properties of the fluids to be transported, the admissible losses of load and the desired flow rate. Several (at least two) rows of circulation channels of the same circuit may be stacked, with the purpose of optimizing the functionality of the exchanger, for example the heat exchange or the flow rate of one of the fluids.

The space between tubes arranged side-by-side may be left free, in this case there may be a slight expansion of the tubes during the HIP, or may be filled entirely or partially by the use of a solid material (wires 8, 9 of example 2 and grooved plates 14, 15 of example 3) or a powdery material. The advantages obtained by the possibility of filling these spaces are, on the one hand, the possibility of using tubes of circular section without the risk of breaking them during the HIP step i/ and, on the other hand, the possibility of inserting into the component a different material so as to improve one of its functions, for example the heat exchange performance, as in the examples 2/ and 3/ or the mechanical strength by inserting a material mechanically stronger than the material which constitutes the tubes.

Whilst the illustrated examples 1/ to 3/ relate to exchangers having specifically two fluid circuits, it is possible to manufacture an exchanger with three or more fluid circuits, by inserting in the stack additional rows comprising tubes sealed at one of their ends.

Whilst in the illustrated examples 1/ to 3/ the metal encapsulation casing consists of four plates, it is possible to replace them by a previously manufactured container, with the advantage of simplifying the sealing welding. Said container then forms a sleeve in which the rows of tubes are previously stacked.

Whilst in the illustrated example 1/, the two collectors are arranged on both sides of the stack, it is possible to arrange them on the same closing plate 41 or 43.

In the example 3/, it is perfectly possible to equip the fluid circuit of the reaction part (tubes 2A of circular section) with static mixers, the geometry thereof being suitable for the most effective mixing of the reactants in the tubes 2A. Such mixers may be inserted individually into a tube 2A after the HIP step i/ according to the invention. The fixing thereof may be carried out, for example, by TIG welding, laser welding or the like.

To reach step d/ the tube may be placed tube per tube or row(s) of a group by row(s).

The heat exchanger modules obtained according to the method of the invention may be assembled with one another, for example by using flanges or by welding pipes for supplying fluids. Thus it is conceivable to produce a heat exchanger system with several modules connected together in which the exchanges are carried out in several steps at different average temperatures or differences in temperature per module which are sufficiently reduced to lower the thermal stresses in the materials. For example, in the case of a heat exchanger in which it is desired to transfer the heat from a first fluid to a second fluid, it is possible to conceive of a modular exchanger system in which each module permits the temperature of the first fluid to be reduced by a given value, thus limiting the stresses relative to a design with a single module having a greater difference in temperature. To achieve this, the inlet temperature of the second fluid may differ from one module to the other. In a further example, a reactor-exchanger module system permits a complex chemical reaction to be carried out in stages, precisely controlling the reaction temperature at each stage, to minimize the risks and maximize the efficiency.

A system of heat exchangers with several modules also permits the costs of maintenance to be reduced, permitting the separate replacement of a faulty module, or even the cost of manufacture by standardizing the modules.

CITED REFERENCE

[1] *Fusion reactor first wall fabrication techniques* G. Le Marois, E. Rigal, P. Bucci, (Fusion Engineering and Design pp 61-62 (2002) 103-110 Elsevier Science B.V);

The invention claimed is:

1. A method for producing a heat exchanger module with at least two fluid circuits each comprising channels, comprising the following steps:
   a/ producing at least two separate groups of metal tubes, each tube being of elongated shape and having at least two straight ends, one thereof being open and the other being blind;
   b/ aligning each of the two groups with side-by-side positioning of the tubes in at least one row per group;
   c/ stacking in a stacking direction to obtain a stack having longitudinal sides and lateral sides, said stacking comprising alternate stacking with top-to-toe positioning of the row(s) of one group and the row(s) of the other group so as to have the rows on top of one another and the blind ends of the tubes of one group arranged on the same lateral side of the stack as the open ends of the tubes of the other group;
   d/ offsetting, in a direction at right angles to the stacking direction, of the row(s) of one group relative to the row(s) of the other group, so as to create gaps on each lateral side of the stack, between the blind ends of the tubes of one group and the open ends of the tubes of the other group;
   e/ encapsulating the stack by positioning respectively one metal casing on the longitudinal sides of the stack of tubes and metal strips at the end of the offset blind ends of the tubes in each gap created;
   f/ welding on the periphery of the casing, each strip and each open end of the tube so as to seal the inside of the encapsulated stack whilst leaving free the open ends of the tubes;
   i/ applying a hot isostatic pressing (HIP) cycle at high pressure to the stack, which has been previously degassed, allowing the pressurizing gas to penetrate into all of the tubes via their open ends so as to obtain welding by diffusion between the tubes of the encapsulated stack, the tubes of each group welded by diffusion forming the channels of a fluid circuit of the module.

2. The method as claimed in claim 1, the casing comprising a through-opening according to which the following steps are carried out between steps f/ and i/:
   g/ degassing the interior of the sealed stack via the through-opening;
   h/ closing the through-opening.

3. The method as claimed in claim 1, the tubes produced according to step a/ being straight tubes.

4. The method as claimed in claim 1, the tubes all being identical to one another.

5. The method as claimed in claim 3, the tubes of at least one group being straight and having a square cross-section over a majority of their length.

6. The method as claimed in claim 3, the tubes of at least one group being straight and having a circular cross-section over a majority of their length, wherein their open and blind ends have a square cross-section.

7. The method as claimed in claim 6, wherein at least one of the ends having the square cross-section being formed by drawing the circular cross-section of the tubes.

8. The method as claimed in claim 7, wherein at least one of the ends of the square cross-section being produced by welding a solid stopper having an end with a square cross-section.

9. The method as claimed in claim 8, the stopper being a solid stopper, thus forming a blind end of a tube.

10. The method as claimed in claim 9, the solid stopper being made of material capable of being dissolved by chemical means.

11. The method as claimed in claim 7, wherein at least one of the ends having the square cross-section being formed by an end piece having a square cross-section in which the length of the circular cross-section of the tube is press-fitted.

12. The method as claimed in claim 11, wherein the heat exchanger module further comprises at least one single end piece for a row of tubes, wherein each tube in the row of tubes is press-fitted inside said end piece.

13. The method as claimed in claim 1, the step e/ being carried out with a casing comprising four metal plates, each being pressed against one of the four longitudinal edges of the stack and the step f/ being carried out by welding the four metal plates in pairs.

14. The method as claimed in claim 1, the HIP cycle according to step i/ being carried out at a pressure of between 500 and 2000 bar.

15. The method as claimed in claim 1, comprising a step j/, subsequent to step i/, consisting of a heat treatment designed to restore properties of the metal materials of the components which constitute said module.

16. The method as claimed in claim 1, comprising a step l/ of transverse boring of the tubes to produce orifices, in the plane of each row and in the vicinity of the lateral sides of the stack, the orifices of each group of tubes, produced by boring, opening out onto one longitudinal side of the stack through the casing, forming a column, the two columns of orifices each being arranged in the vicinity of one lateral side of the stack and opposing one another.

17. The method as claimed in claim 16, comprising a step m/ of welding a fluid collector to the casing, opposite and around each column of orifices.

18. The method as claimed in claim 2, comprising a step of cleaning the constituent parts of the encapsulated stack before the degassing step g/.

19. The method as claimed in claim 4, wherein the tubes of at least one group being straight and having a square cross-section over their length.

20. The method as claimed in claim 4, wherein the tubes of at least one group being straight and having a circular cross-section over a majority of their length, wherein their open and blind ends have a square cross-section.

* * * * *